United States Patent

Boyce

[15] 3,654,449

[45] Apr. 4, 1972

[54] CALCULATOR INPUT MEANS TO BYPASS CONVENTIONAL KEYBOARD INPUT

[72] Inventor: Kenneth D. Boyce, Mountain View, Calif.

[73] Assignee: Diversified Electronics Co., Inc., Sunnyvale, Calif.

[22] Filed: Nov. 5, 1970

[21] Appl. No.: 87,034

[52] U.S. Cl. ....................235/156, 235/92 R

[51] Int. Cl. ....................G06f 7/48

[58] Field of Search ....................235/156, 92 R; 340/172.5, 365

[56] References Cited

UNITED STATES PATENTS 3,342,979 9/1967 Wright et al. ....................235/92
3,373,267 3/1968 Swann ....................235/92
3,412,238 11/1968 Lineback ....................235/92

*Primary Examiner*—Malcolm A. Morrison
*Assistant Examiner*—David H. Malzahn
*Attorney*—Townsend & Townsend

[57] ABSTRACT

Apparatus for use with a electronic calculator of the type having a keyboard input wherein the apparatus comprises means for receiving input pulses and for generating a number of output pulses for each input pulse, respectively, with one of the output pulses being used to actuate the numeral portion of the electronic calculator while another output pulse is used to actuate the portion of the calculator having to do with an arithmetic function, such as add or subtract. The apparatus further includes a device for deactuating the output pulse generating means after a predetermined number of output pulses have been generated. The input device of the apparatus can be a count probe, an architect's probe, an engineer's probe or planimeter.

34 Claims, 10 Drawing Figures

INVENTOR.
KENNETH D. BOYCE
BY Townsend and Townsend
ATTORNEYS

INVENTOR.
KENNETH D. BOYCE

BY Townsend and Townsend

ATTORNEYS

INVENTOR.
KENNETH D. BOYCE
BY Townsend and Townsend
ATTORNEYS

INVENTOR.
KENNETH D. BOYCE

BY Townsend and Townsend

ATTORNEYS

INVENTOR.
KENNETH D. BOYCE
BY Townsend and Townsend
ATTORNEYS

INVENTOR.
KENNETH D. BOYCE
BY Townsend and Townsend
ATTORNEYS

CALCULATOR INPUT MEANS TO BYPASS CONVENTIONAL KEYBOARD INPUT

This invention relates to improvements in electronic calculators and, more particularly, to apparatus for directing data into a electronic calculator in bypassing relationship to its keyboard input.

Electronic calculators are generally provided with a keyboard by which numerical data can be directed thereinto. The keyboard also includes keys which permit the calculator to perform the usual arithmetical functions such as add, subtract, multiply and divide. A calculator of this type usually requires that, to enter a number into the memory thereof, a particular key corresponding to the number must first be depressed, following which the "add" key must then be depressed. The operation requires two manual functions, namely, the depressing of two different keys. Other arithmetic functions performed with the calculator require, in each case, two depressions, assuming in every case a number must first be entered into the calculator before the arithmetic function is performed.

It has been found that electronic calculators of this type can be made more versatile by providing apparatus by means of which data can be directed into the electronic circuitry of the calculator without having to utilize the keyboard itself. While such apparatus may require a manual function to enter a number into the circuitry, it eliminates the need for depressing two keys of the keyboard to enter a single number into the calculator. To this end, the apparatus includes a pulse generator which is triggered by a suitable device, such as a multivibrator or the like when the input to the device receives a data-defining signal, such as a count pulse from a count probe or a distance-indicating pulse from an architect's probe or an engineer's probe. The output of the pulse generator is directed to a counter which has an output signal for each output pulse of the pulse generator. Moreover, an inhibiting device, such as a comparator set to a particular number, is provided to disable the pulse generator after the particular number has been counted by the counter. When the comparator is constructed to disable the pulse generator after two output pulses have been generated thereby, it is possible to utilize the apparatus of this invention to enter a number into an electronic calculator for each input signal to the apparatus itself. Moreover, it is possible to subtract numbers as well as add numbers in the calculator with the apparatus and, with the use of a suitable selector mechanism, it is possible to couple the apparatus so that input pulses are multiplied by preselected numbers as they are directed into the electronic circuitry of the calculator. This feature permits direct reading of distances, for instance, when an architect's probe or an engineer's probe is utilized to measure distances on scale drawings.

Another feature of the invention resides in the fact that, even though the apparatus is coupled to the calculator, the calculator can be used in the normal fashion and is not inhibited in any way because of the connection of the apparatus thereto. Thus, the apparatus can be utilized as a permanent attachment to the calculator to provide an improvement therefor to increase the versatility of the calculator by allowing the same to receive data from its own keyboard or from the apparatus which is triggered by an external data input device, such as a probe of any one of the aforesaid types.

An irregular area measuring device can also be utilized as a data input probe. Such a device utilizes an encoder wheel which produces an input pulse per unit of distance of travel. The wheel can also be provided with means for indicating its direction of rotation and to provide a signal indicating a particular direction. As it moves, the wheel causes numbers corresponding to distances to be added and subtracted in accordance with the direction of rotation of the wheel. The resultant algebraic sum shown on the calculator display represents the irregular area to be measured.

The primary object of this invention is to provide an apparatus for use with an electronic calculator of the type having a manually operated keyboard wherein the apparatus utilizes a signal input device and a pulse generator for generating a predetermined number of output pulses for each input signal received from the device so that the output pulses can be directed to the circuitry of the calculator in bypassing relationship to its keyboard to eliminate manual operation of the latter which allows the data to be directed into the calculator externally of the keyboard.

A further object of this invention is to provide a electronic calculator in combination with an external data input device whereby the calculator can receive data either from the keyboard or its device and can operate in the usual manner so as to render the calculator more versatile then conventional electronic calculators.

A further object of this invention is to provide apparatus of the aforesaid character which can function to cause multiplication of the input pulses to the calculator so that distance measuring probes can be used to determine actual distances on scale drawings so as to provide a labor-saving means for architects and engineers without the necessity of relying on mental calculations.

The apparatus of this invention can be provided with a buffer circuit which receives data from a probe at a relatively high rate, i.e., a rate higher than the rate at which the electronic calculator itself can respond to the incoming data. The buffer rapidly stores the incoming data temporarily and then reads it out at a lower rate to assure that the calculator circuitry receives the incoming data at the proper rate. Thus, an architect's probe or an engineer's probe can be moved quickly over a drawing at a rate higher than the response time of the calculator and all of the data will be properly recorded in the calculator.

Thus, a further object of this invention is to provide apparatus of the aforesaid character wherein a buffer section receives the incoming data before it is directed to the calculator to thereby assure that the data can be read into the apparatus at a rate higher than the rate at which the electronic calculator can respond to thereby assure that no data will be lost even though it is rapidly read into the apparatus.

The invention can also be used with a calculator having a memory and capable of performing a recall memory function based upon a number stored in the memory. In this way, any number can be stored in the memory and be incremented or decremented when input pulses are generated by any of the above-mentioned probes to immediately provide calculations which would otherwise require manual use of the calculator keyboard after such input pulses were counted.

Thus, another object of this invention is to provide apparatus of the type described which can be utilized with an electronic calculator having a memory by means of which a recall memory function can be performed so that manual use of the calculator keyboard can be avoided after a series of input pulses have been counted so as to provide immediate calculations based upon a number in the calculator memory which represents a unit value of a parameter.

Other objects of this invention will become apparent as the following specification progresses, reference being had to the accompanying drawings for an illustration of an embodiment of the invention.

Figure 1:
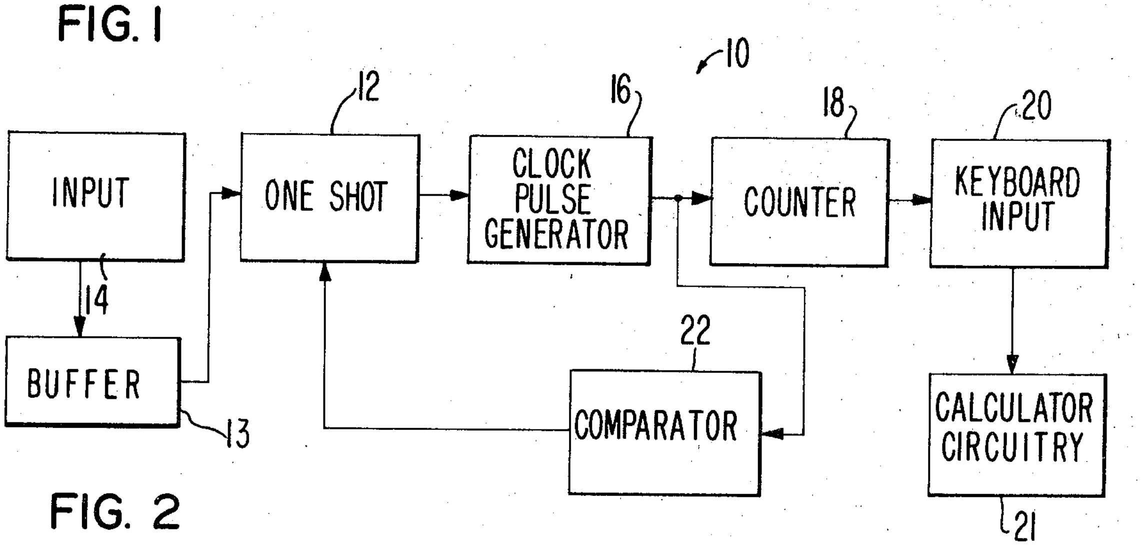
FIG. 1 is a block diagram of the apparatus of this invention showing its connection with the circuitry of an electronic calculator.

The apparatus of this invention is broadly denoted by the numeral 10 and is illustrated in block form in FIG. 1 as being connected to the internal circuitry of an electronic counter. Apparatus 10 includes a triggering means such as a one-shot multivibrator 12, which receives an actuating signal through a buffer 13 from an input device 14, whereupon multivibrator 12 is triggered to provide a particular output signal. This output signal actuates a clock pulse generator 16 which generates a number of output pulses during the time when the output signal exists. The output pulses, in turn, clock a counter 18 coupled to a keying input device 20, the output of which is coupled to the signal input means of the internal electronic circuitry 21 of an electronic calculator for actuating the same in bypassing relationship to the keyboard of the calculator. Pulse generator 16 is also coupled with a comparator 22 which operates to deactuate multivibrator 12 and thereby disable pulse generator 16 after the latter has generated a predetermined number of pulses, i.e., when counter 18 has counted to a predetermined number.

The general operation of apparatus 10 is as follows: an input signal in the form of pulses from a data input probe forming input 14 represents discrete data which is first stored temporarily in buffer 13, then is directed into and triggers multivibrator 12, the latter causing the actuation of pulse generator 16 which generates a series of output pulses for clocking counter 18. For every input pulse from input 14, there will be at least two output pulses from counter 18 which are directed to keying input device 20. One of these output pulses will cause a particular number to be entered into the circuitry 21 of the calculator and the other output pulse will effect an "add" or "subtract" action of the calculator circuitry. Comparator 22 is pre-wired so as to operate to deactuate multivibrator 12 after the second pulse, thus disabling generator 16 and thereby deactuating counter 18. In this way, only a single input pulse 14 instead of a two-step manual keying function is needed to enter a number into the circuitry of the calculator.

Input 14 can comprise any one of a number of different types of input probes, such as a count probe for counting a particular number of items or articles, an architect's probe, and an engineer's probe, the latter two probes being used, for instance, to measure scaled-down distances on drawings. With the use of an architect's probe, a distance of 1 foot will appear, for example, as a distance on the drawing of one-fourth inch, one-eighth inch, one-sixteenth inch or one thirty-second inch. With an engineer's probe, the scale factor may be such that 1 foot of actual distance appears as one-tenth inch, one-thirtieth inch, one-fortieth inch or one-fiftieth inch on the drawing.

Figures 2, 3, 5:
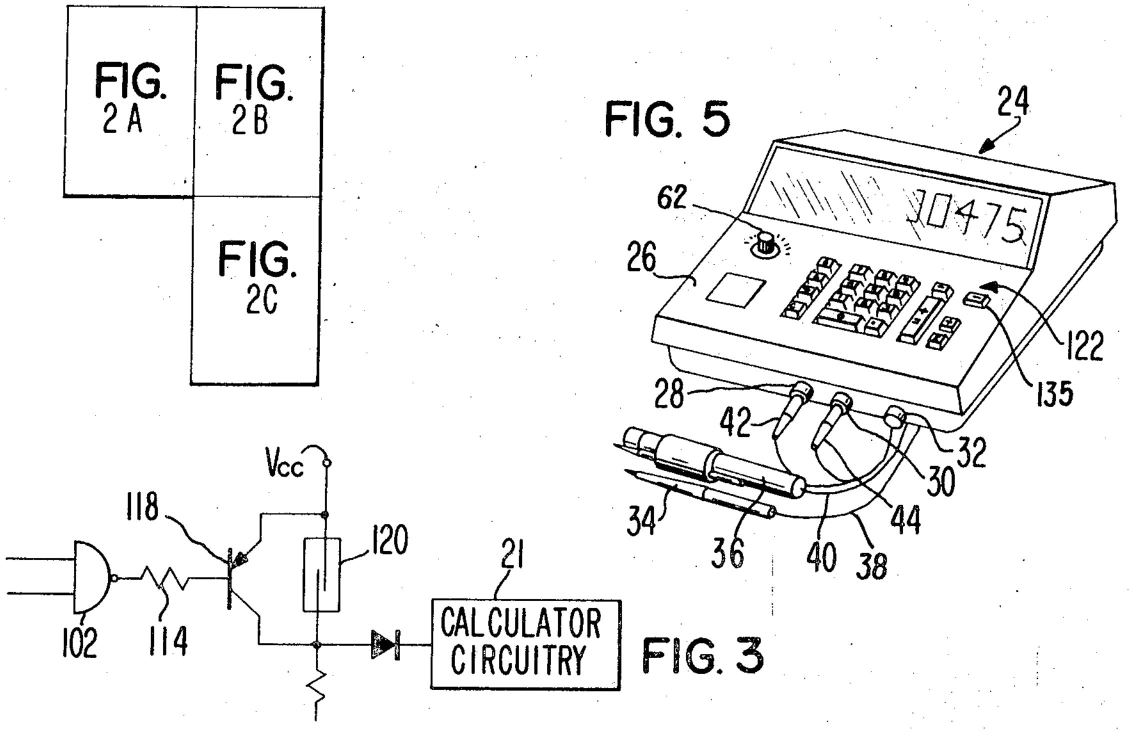
FIG. 2 is a block diagram illustrating the relative positions of the three circuits shown in FIGS. 2A, 2B, and 2C.
FIG. 3 is a fragmentary, schematic view of a portion of the circuitry for connecting the apparatus of FIG. 1 with the circuitry of an electronic calculator.
FIG. 5 is a perspective view of an electronic calculator showing two types of data probes coupled therewith.

Any one of the above-mentioned probes can be coupled in any suitable manner to apparatus 10. For purposes of illustration, the electronic calculator, denoted by the numeral 24 and shown in FIG. 5, is provided with a housing 26 which contains apparatus 10 and has a number of sockets 28, 30 and 32 for the count probe, the architect's probe and the engineer's probe, respectively. Thus, the probes can be used interchangeably with the calculator by selectively setting a rotary scale factor switch in a manner to be described. A count probe 34 and an architect's probe 36 are shown adjacent to the calculator in FIG. 5. Lead wires 38 and 40 interconnect probes 34 and 36 with plugs 42 and 44, respectively, the plugs being removably connected to respective sockets 28 and 30.

Figure 2A:
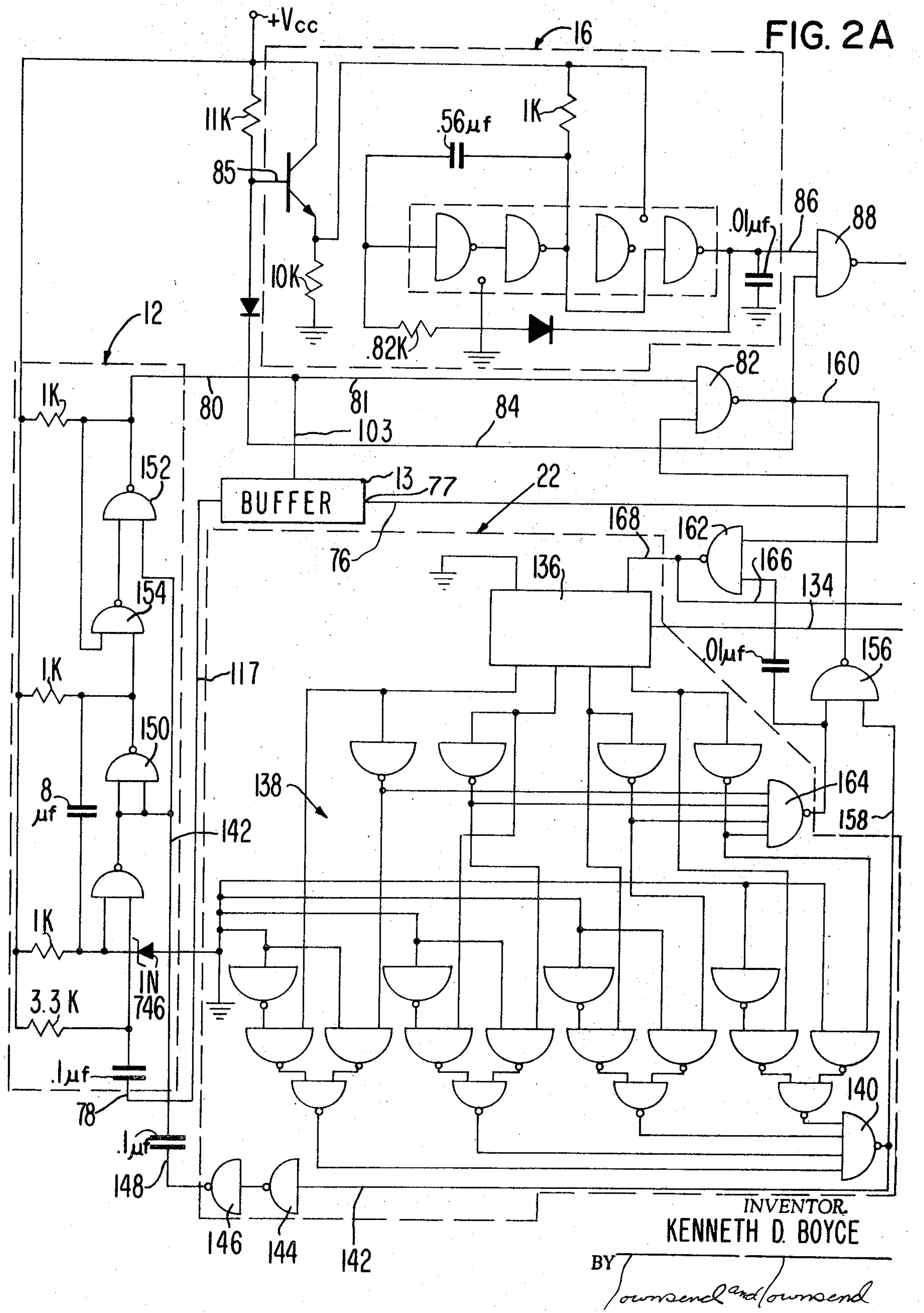
FIGS. 2A, 2B and 2C are schematic diagrams of specific elements shown in FIG. 1.
Figure 2B:
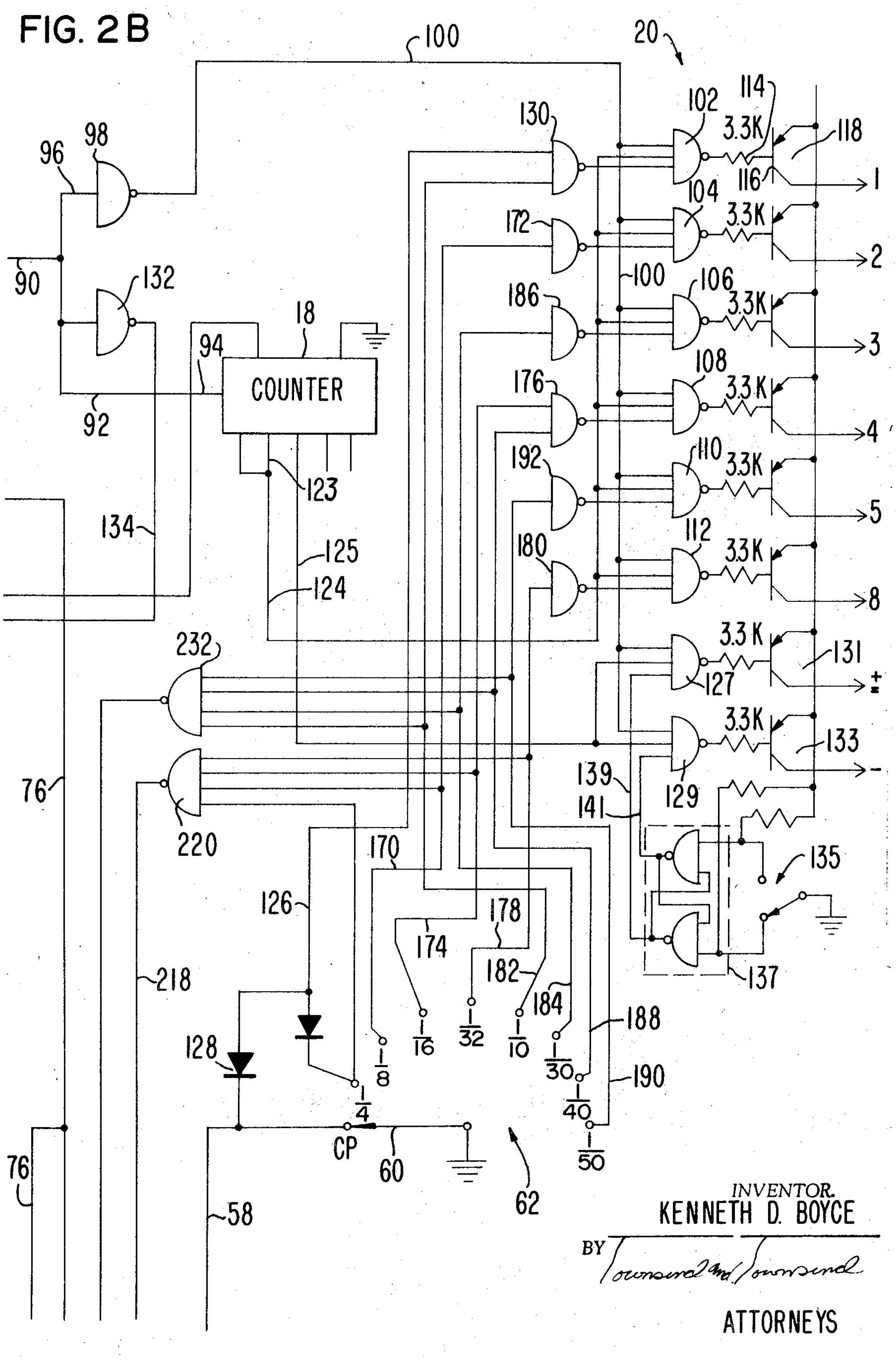
Figure 2C:
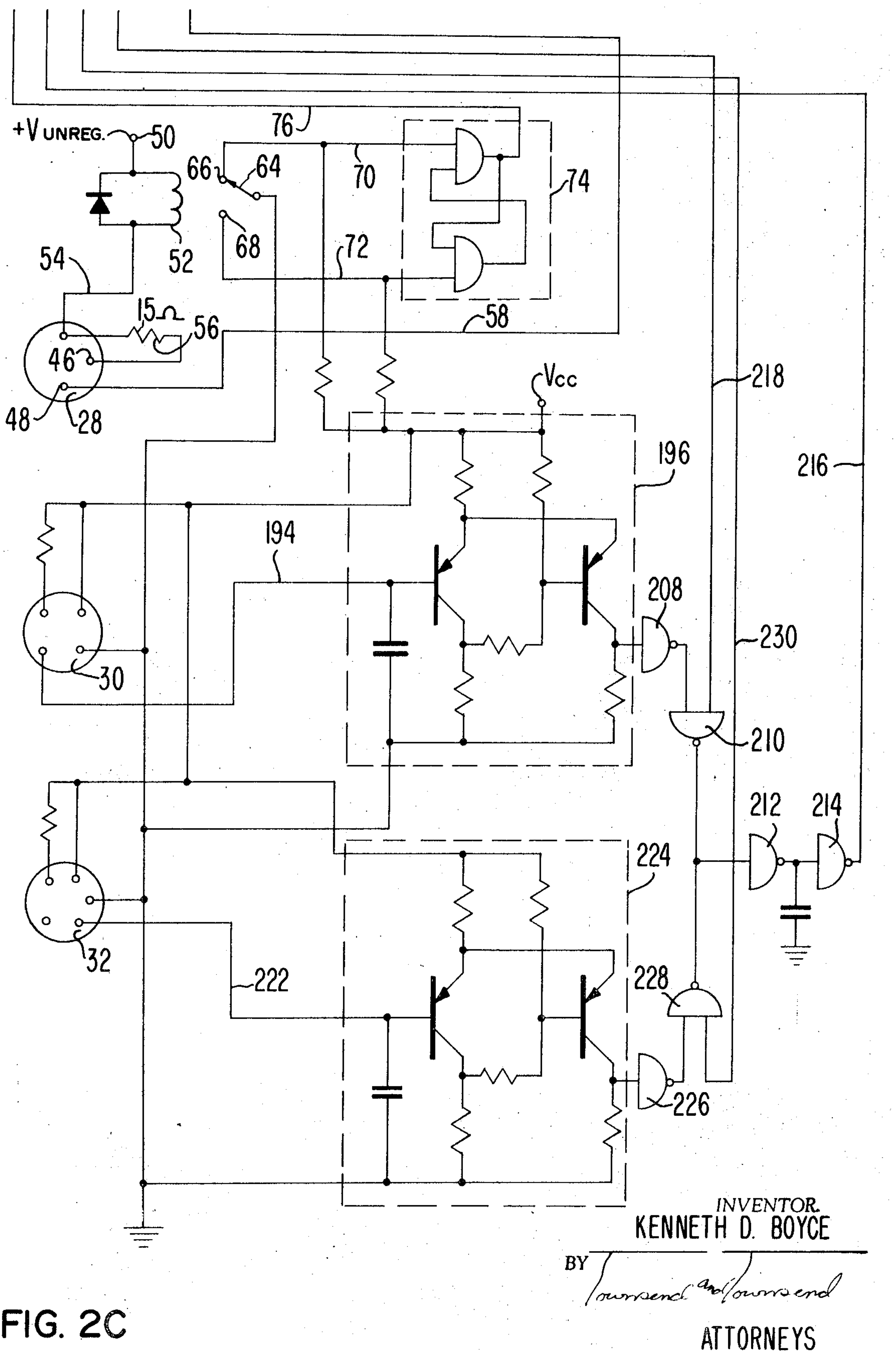

Socket 28 is provided with three contacts as shown in FIG. 2C, and, when the switch of the count probe closes, contacts 46 and 48 of this socket are interconnected so as to provide a closed electrical path which includes the following (FIG. 2C): terminal 50 coupled to a voltage source, relay 52, lead 54, resistance 56, contacts 46 and 48, lead 58, shiftable contact 60 (FIG. 2B) of a rotary scale factor switch 62 and then to ground. When relay 52 is actuated, switch contact 64 thereof is moved from a first contact 66 to a second contact 68, the latter contacts being connected by leads 70 and 72, respectively, to a switch contact bounce eliminator 74 shown within the dashed line rectangle in FIG. 2C. When this occurs, the signal output of eliminator 74 is high and is connected by lead 76 which, as shown in FIG. 2A, is coupled to the input 77 of buffer 13 whose output is coupled to the input 78 of multivibrator 12, the latter being shown within a dashed rectangle in FIG. 2A.

Figure 7:
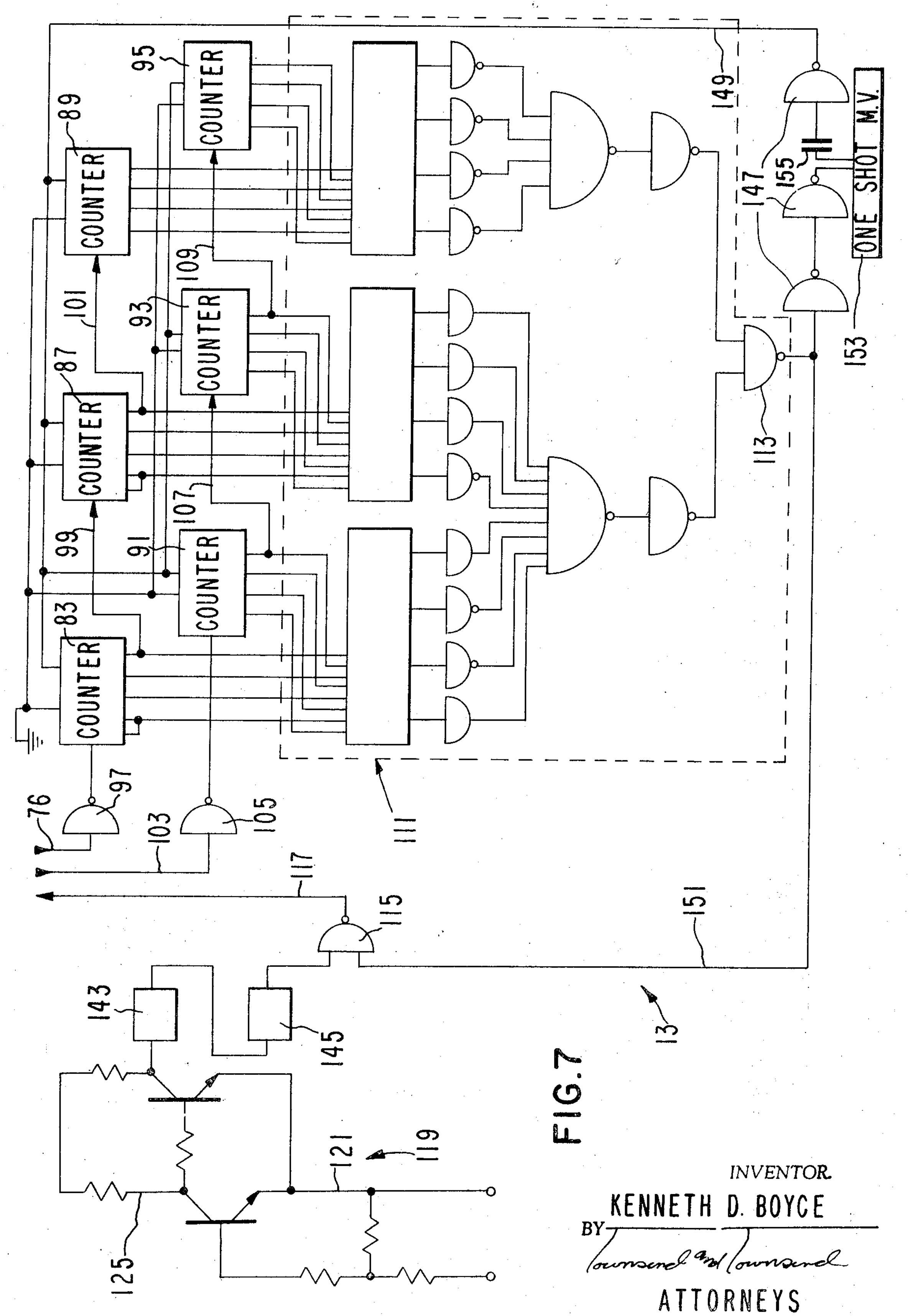
FIG. 7 is a schematic diagram of the buffer of this invention.

Buffer 13 is shown in detail in FIG. 7 and includes a number of first bcd counters 83, 87, and 89 which are connected in series with each other and a number of second bcd counters 91, 93 and 95, also connected in series with each other. Each of the aforesaid bcd counters has a number of outputs and a means for resetting the same to zero. Lead 76 is connected to the input NAND gate 97 whose output is connected to the input of counter 83. The last output of counter 83 is connected by a lead 99 to the first input of counter 87, and the last output of counter 87 is connected by a lead 101 to the first input of counter 89. A lead 103 connected to the output 80 of multivibrator 12 (FIG. 2A) is connected to the input of a NAND gate 105 whose output is connected to the input of counter 91. A lead 107 connects the last output of counter 91 with the first input of counter 93, and the last output of counter 93 is connected by lead 109 to the first input of counter 95.

A comparator 111 is provided to compare the counts of corresponding first and second counters, i.e., the counts of counters 83 and 91 are to be compared, the counts of counters 87 and 93 are to be compared, and the counts of counters 89 and 95 are to be compared. The corresponding count outputs of each of these pairs are coupled together at respective comparator inputs, and, so long as there is a correspondence between the counts of the counters of each pair, the comparator will be balanced. The comparator has an output NAND gate 113 whose output is, for instance, low when a comparison or correspondence is established between each of the aforesaid pairs of counters. If the comparator is unbalanced, such as when the counts on the outputs of gate 83 do not correspond with those on the outputs of gate 91, the output of gate 113 will be high and such output is connected by a lead 151 to the input of another NAND gate 115 whose output is connected by lead 117 (FIGS. 2A and 7) to the input 78 of multivibrator 12. The other input of gate 115 is coupled to a signal source 119 whose output signal has a frequency of 30 Hertz. Thus, when the output of gate 113 is high, the output of 115 alternately goes high and low due to the input pulses from source 119 which is always actuated.

Source 119 can be of any construction, but for purposes of illustration, it utilizes the 120 Hertz ripple frequency of a full wave rectifier whose output attenuator 121 is coupled to a circuit 125 for squaring the pulses. A pair of frequency dividers 143 and 145, each dividing the frequency by 2, are provided at the output of circuit 125, the output of divider 145 being coupled to the input of gate 115.

When a count enters counter 83 from an input probe via line 76 and gate 97, it upsets the balance between counters 83 and 91 and this unbalance is noted by comparator 111 (shown in the dashed line box of FIG. 7) and the output of gate 113 goes high. If both inputs of gate 115 are high, the output of the gate will be low but, this gate output will go high during the fall time of the pulse from source 119. Thus, a pulse will be directed by lead 117 into the input 78 of multivibrator 12 and this input pulse to the multivibrator will correspond to the data pulse generated by the probe. This pulse will actuate multivibrator 12 whose output will change and this change of output will be in the form of a pulse received by counter 91. Correspondence between counters 83 and 91 will then be reestablished, assuming only a single count has reached counter 83 so that comparator 111 will note this balance and the output of gate 113 will then go low causing the output of gate 115 to remain high, its equilibrium or initial state.

When gate 113 goes low, a signal is developed at the output of the last of a series connected gates 147 and this signal is directed by a lead 149 to the reset means of each of counters 83, 87, 89, 91, 93 and 95. This signal then resets the counters to zero and the counters are ready to receive additional pulses in the manner described. A one-shot multivibrator 153 is provided in series with gates 147 on one side of a capacitor 155 also in series with gates 147 to standardize the pulse width of the reset signal directed by line 149 to the reset means of each of the above-mentioned counters.

In the event that a number of input counts are read into counters 83, 87 and 89 before a count is read into counters 91, 93 and 95, these input counts are stored in counters 83, 87 and 89 while counters 91, 93 and 95 count up to the number of counts in counters 83, 87 and 89 so as to restore the balance therebetween. During this time, the output of gate 113 will be high so that the output of gate 115 will go high on the negative going side of each of the pulses from source 119. Thus, pulses will be supplied to multivibrator 12 at a 30 Hertz rate which is safely below the highest rate at which the electronic calculator can respond to the incoming pulses thereto. Thus, buffer 13 allows data to be rapidly read thereinto, but permits the data to be read out at a lower rate. The additional first counters 87 and 89 supplement counter 83 and counters 93 and 95 supplement counter 91.

Multivibrator 12 has a signal output 80 which is normally high and, when the input signal is received from contact bounce eliminator 74, the signal output of the multivibrator goes low. Output 80 is coupled by a lead 81 to the input of a NAND gate 82 whose output is coupled by a lead 84 to the input 85 of clock pulse generator 16 shown within the dashed rectangle of FIG. 2A. Thus, pulse generator 16 is caused to generate output pulses at its signal output 86 which, in turn, causes the output of a gate 88 to go low each time the pulse is at a maximum. The output of gate 88 is connected by leads 90 and 92 to the clock input 94 of counter 18 (FIG. 2B), whereby the counter is caused to count to a number equal to the number of output pulses generated by pulse generator 16.

Lead 90 is also coupled by a lead 96 to the input of a gate 98 whose output is coupled by a lead 100 to a keying input device 20, specifically to a first input of each of a plurality of gates 102, 104, 106, 108, 110 and 112 forming parts of device 20. The output of each of the last-mentioned gates is coupled by a resistor 114 to the base 116 of a transistor 118 which acts as a switch to direct a particular pulse to calculator circuitry 21. This action is shown in FIG. 3 wherein transistor 118 is in bypassing relationship to a reed or other type of switch 120 forming a part of the calculator keyboard 122 (FIG. 5), the latter having a reed switch for each of the numerals 0 to 9, respectively, a reed switch for the plus-equal function of the calculator, and a reed switch for the minus function thereof. A push-button key is provided to actuate each reed switch, respectively.

In FIG. 2B, counter 18 is shown as having a first signal output 123 coupled by a lead 124 to a second input of each of gates 102, 104, 106, 108, 110 and 112, respectively. These gates correspond to the keyboard numerals 1, 2, 3, 4, 5 and 8 of calculator 24. The numerals 0, 6 7 and 9 of the keyboard have no corresponding connections with apparatus 10. The reason for this is that apparatus 10, by the use of rotary switch 62 (FIG. 2B) can provide any one of a number of different multipliers for multiplying the signal output pulse from output 123 of counter 18 so as to obtain a particular product for storage and display by calculator circuitry 21, depending upon the setting of switch contact 60 of rotary switch 62. For instance, to use the count probe as the input means, switch contact 60 is coupled to the fixed contact denoted as CP (FIG. 2B) wherein a lead 126, through a diode 128, connects an input of gate 130 to ground with the output of gate 130 being coupled to the third input of gate 102. Thus, the output of gate 130 will be high so that all three inputs of gate 102 will be high when the first pulse is generated by pulse generator 16. This will cause the output of gate 102 to go low, cutting off transistor 118 to provide a corresponding first input signal for calculator circuitry 21.

The second count or output pulse from counter 18 is directed by a lead 125 to respective first inputs of gates 127 and 129 forming parts of keying device 20 (FIG. 2B). These two gates correspond to the plus- equal key and the minus key, respectively, of the keyboard 122. The outputs of gates 127 and 129 are coupled through resistances to respective transistors 131 and 133 which operate in the same manner as described above with respect to transistor 118. A selector switch 135 is provided to select either the plus-equal function or the minus function, switch 135 being coupled to a flip-flop 137 whose outputs are connected by leads 139 and 141, respectively, to respective second inputs of gates 127 and 129. With the structure so far described, it is clear that the counts provided by the count probe can be added together or subtracted from each other depending upon the position of the selector switch 135.

As clock pulses issue from generator 16, the connection of lead 90 to the input of a gate 132 (FIG. 2B) causes the output of the gate to go low when the pulses are present, i.e., when the gate input is high. The output of gate 132 is connected by a lead 134 to the input of a counter 136 forming a part of comparator 22, the latter being shown in the dashed line box of FIG. 2A. Counter 136 has four signal outputs coupled to a logic network broadly denoted by the numeral 138 (FIG. 2A) which is hard wired to provide high inputs to a gate 140 at the output of the comparator after counter 136 has counted to a predetermined number, such as the number 2, if the scales shown on the rotary switch 62 of FIG. 2B are used. This is the same number to which counter 18 has counted.

When gate 140 has all high inputs, i.e., when counter 136 has counted to the predetermined number, the output of gate 140 will be low. A lead 142 connects the output of gate 140 through gates 144 and 146 and a capacitor 148 to the respective first inputs of gates 150 and 152 forming parts of multivibrator 12. A third gate 154 between gates 150 and 152 assures that the output of gate 152 will be high when the output of gate 140 of comparator 22 is low. This condition cuts off the operation of pulse generator 16 since the output of gate 82 will then go low. Pulse generator 16 will not again be actuated until the next input pulse from a probe is received by multivibrator 12.

When the output of gate 140 of comparator 22 goes low, a gate 156 coupled by lead 158 to the output of gate 140 goes high so that inputs of gate 82 make the latter go low. The output of gate 82 is coupled by a lead 160 to an input of gate 162 and, since the other input of gate 162 is high due to its connection with the output of a gate 164 of comparator 22, the output of gate 162 goes low to provide a reset signal on lead 166 to counter 18 and a reset signal on lead 168 to counter 136. Thus, the counters are simultaneously reset and are then ready to operate again in the manner described above.

While the foregoing has been described with respect to the use of the count probe, it is clear that the same procedure can be followed for denoting distances when using the architect's probe or the engineer's probe. For the architect's probe, shiftable contact 60 will be on any one of the fixed contacts of switch 62 denoted by ¼, ⅛, 1/6 or 1/32. When using the engineer's probe, shiftable contact 60 will be on any one of the fixed contacts denoted by 1/10, 1/30, 1/40 or 1/50. The particular contact is selected by manipulating knob 62 on the keyboard panel of calculator 24 as shown in FIG. 5. When shiftable contact 60 is on the fixed contact denoted by ¼, a single input pulse from the probe will cause gate 102 to go low to provide an input signal for calculator circuitry 21. The reason for this is that lead 126 connects the contact represented by ¼ with the input of gate 130, making the input of the latter low so that its output is high. Since the other two inputs of gate 102 are high, its output is low.

Similarly, a lead 170 connects the input of a gate 172 with the fixed contact denoted by ⅛, the output of gate 172 being coupled with an input of gate 104. Thus, a single pulse generated by counter 18 will then trigger the portion of the calculator circuitry corresponding to the numeral "2" rather than the portion corresponding to the numeral "1" so as to indicate that each unit distance traversed by the probe will be twice the distance traversed when switch contact 60 is coupled to the ¼ contact. The calculator will automatically store and display this same information. To further illustrate the scaling function of apparatus 10, a lead 174 couples the fixed contact denoted by 1/16 with an input of a gate 176 whose output is coupled to the input of gate 108, the latter corresponding to the numeral "4" of the calculator circuitry so as to indicate that a unit distance traversed by the architect's probe when shiftable contact 60 is on the 1/16 contact will be four times the unit distance when shiftable contact 60 is on the ¼ contact. Finally, a lead 178 connects the 1/32 fixed contact with a gate 180 whose output is connected with the input of gate 112, the latter corresponding to the portion of the calculator circuitry related to the numeral "8."

In view of the foregoing, it will be clear that the effect of changing the scales by rotating shiftable contact 60 is to multiply the incoming pulses to the calculator circuitry by specific multipliers. Thus, the user of apparatus 10 can first note the scale factor of a particular drawing to be measured, set switch 62 to that scale factor, and traverse the desired distances with the probe. The distance in feet will automatically be calculated, stored and displayed by the calculator circuitry so as to require no mental steps on the part of the user, other than to decide how to set the switch.

When using the engineer's probe, the same procedure applies except that different scale factors are used. The multipliers for the 1/10, 1/30, 1/40 and 1/50 scale factors are 1, 3, 4 and 5, respectively. As shown in FIG. 2B, a lead 182 connects the 1/10 contact with the input of gate 130; a lead 184 connects the 1/30 contact with the input of gate 186 whose output is coupled to the input of gate 106; a lead 188 connects the 1/40 contact with an input of gate 176; and lead 190 couples the 1/50 contact with the input of a gate 192 whose output is coupled to an input of gate 110.

Figure 4:
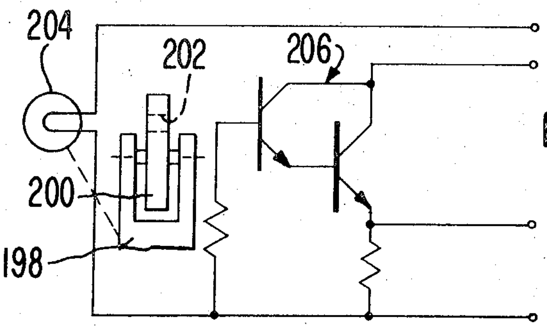
FIG. 4 is a schematic view of a data probe usable with the apparatus of FIG. 1.

When the architect's probe is utilized, it is coupled to socket 30, whose output is connected by a lead 194 (FIG. 2C) to a first Schmitt trigger device 196. For purposes of illustration, the architect's probe is shown schematically in FIG. 4, wherein a hand-held, tubular body 198 is provided with a wheel 200 at one end thereof for traversing distances to be measured, the wheel having an opening 202 therethrough at a location spaced from its axis of rotation. A light source 204 is also carried by body 198 at a location to permit a beam of light to be directed through opening 202 and onto a phototransistor assembly 206 each time the wheel makes one revolution, i.e., traverses a predetermined distance. If desired, the wheel can have more than one opening. In such a case, the openings will be symmetrically located about the wheel axis so as to provide for a number of output pulses for each revolution of the wheel.

The output of phototransistor assembly 206 is coupled to the input of a gate 208 whose output is coupled to the input of a gate 210. The output of gate 210 is coupled to a pair of gates 212 and 214 in series with each other and the output of gate 214 is connected by a lead 216 to the input of buffer 13 through lead 76 as shown in FIGS. 2A and 2B. The output of gate 210 is high because a lead 218 (FIGS. 2B and 2C) is coupled to the output of a gate 220 whose inputs are coupled to the following fixed contacts of rotary switch 62: ¼, ⅛, 1/16 and 1/32. Thus, the output of gate 220 will be high when shiftable contact 60 of rotary switch 62 is on one of these latter contacts. When the output of gate 220 is high, this will assure that the output of gate 214 will be high to trigger multivibrator 12 for a given pulse through the Schmitt trigger 196 from the architect's probe.

When the engineer's probe is used, it will be coupled with socket 32 and it will generate an input signal on lead 222 to the input of a second Schmitt trigger 224 whose output is coupled with a gate 226, the latter, in turn, being coupled to an input of a gate 228 whose other input is coupled by a lead 230 to the output of a gate 232 whose inputs are connected to the following fixed contacts of rotary switch 62: 1/10, 1/30, 1/40 and 1/50. Thus, gate 214 will have a high output each time the rotary wheel (FIG. 4) makes one revolution if rotary contact 60 is on any one of the last-mentioned fixed contacts of switch 62.

While the foregoing description has been given with respect to two clock pulses from pulse generator 16, it is clear that by using more than two clock pulses, more than one number can be selected in the calculator to provide larger scale factors.

An irregular area measuring device can be utilized as the input means for apparatus 10 by utilizing the probe minus feature afforded by switch 135. To this end, an encoder wheel will be provided that produces an output pulse by unit distance as well as a signal which denotes the direction of rotation of the wheel. The wheel can be put into a regular OTT planimeter. As the wheel rotates, numbers representing the distances traversed in accordance with the selected scale are added and subtracted depending upon the direction of rotation of the wheel. The resultant sum displayed by the calculator represents the area bounded by the distance traversed by the wheel.

Figure 6:
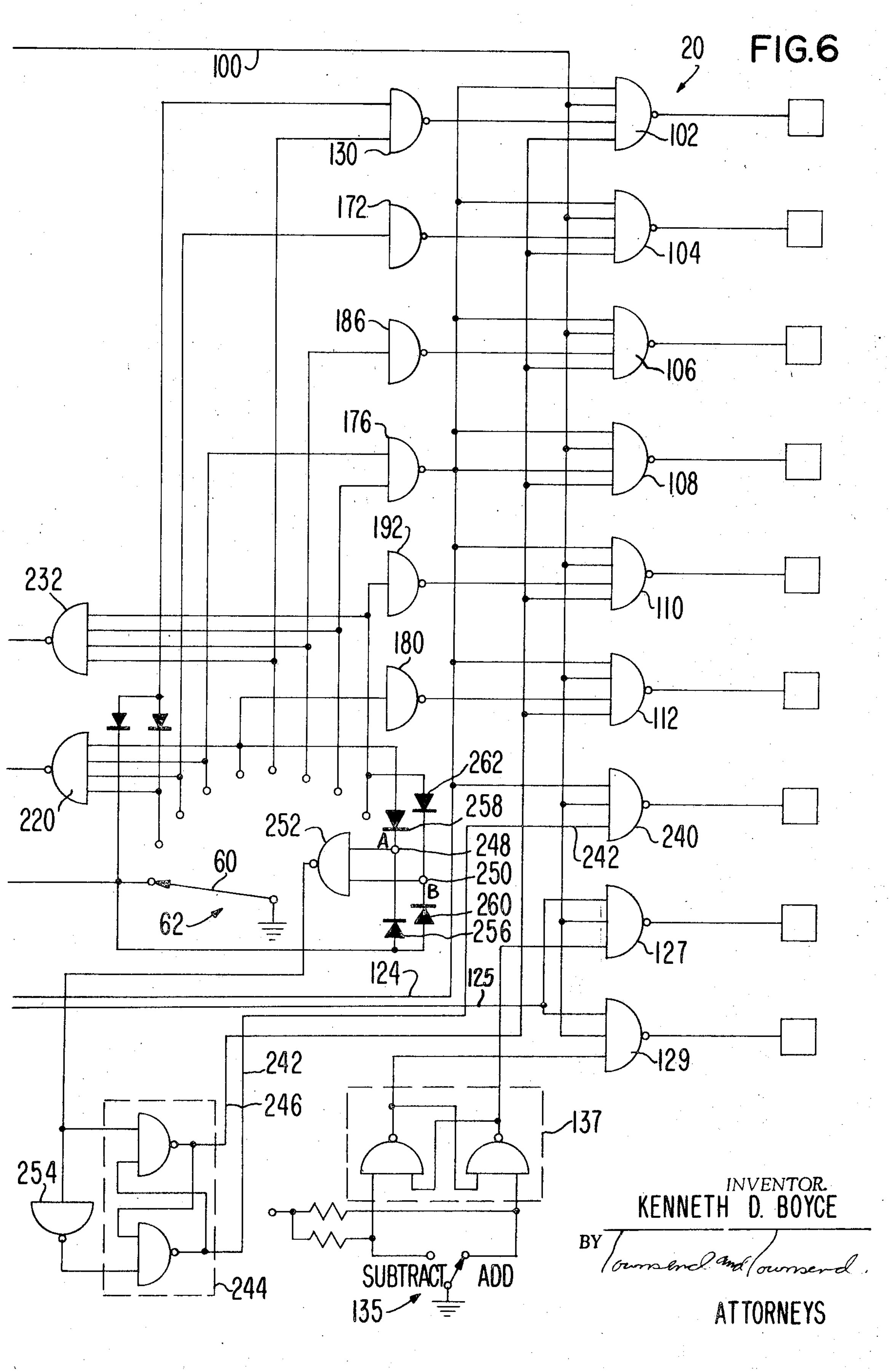
FIG. 6 is a modified form of a portion of the apparatus to permit it to be used with an electronic calculator having a memory.

Apparatus 10 can be modified in the manner shown in FIG. 6 so that it can be used with an electronic calculator having a memory and a recall memory function. To this end, keying input device 20 is provided, in addition to gates 102, 104, 106, 108, 110, 112, 127 and 129, with a gate 240 having a first input coupled by lead 100 to the output of gate 98, a second input coupled by lead 124 to the first signal output of counter 18, and a third input coupled by a lead 242 to one output of a flip-flop 244, the other output of the flip-flop being coupled by a lead 246 with respective inputs of gates 102, 104, 106, 108, 110 and 112. The last-mentioned gates have inputs coupled with the outputs of respective gates 130, 172, 186, 176, 192 and 180 in the manner described above. Also, first inputs of gates 127 and 129 are coupled to respective signal outputs of a flip-flop 137, the latter being coupled to switch 135 in the manner described above. Second inputs of gates 127 and 129 are coupled to lead 100 and third inputs of these gates are coupled by lead 125 to the second signal output of counter 18.

As before, gates 102, 104, 106, 108, 110 and 112 are coupled to the numeral portions of calculator circuitry 21 which correspond to numerals 1, 2, 3, 4, 5 and 8, respectively. Gate 127 is coupled to that portion of circuitry 21 which corresponds to the plus-equal function of the calculator and gate 129 is coupled with the portion corresponding to the minus function of the calculator. Switch 135 selects between the plus-equal function and the minus function of the calculator.

The output of gate 240 is coupled to that portion of calculator circuitry 21 which corresponds to the recall memory function. It is to be noted that the outputs of the gates 102 through 112, 127, 129 and 240 are not coupled through resistances and transistors to calculator circuitry 21 as shown in FIG. 2B because it is not necessary to invert the respective signals emanating from such gates. Hence, the outputs are connected directly to the respective portions of the calculator circuitry.

The keying input device shown in FIG. 6 operates to utilize the memory in making specific calculations so as to avoid having to make additional calculations using the keyboard of the calculator after obtaining input data using the keying input device 20 shown in FIG. 2B. When using the modified structure, the data stored in the main memory of the calculator is incremented or decremented, i.e., recalled, each time an input pulse is directed to multivibrator 12, depending upon the setting of switch 135. Thus, when switch 135 is in the add position and a number stored in the memory is recalled, it is added to the number or numbers previously recalled so that a cumulative sum is obtained which is equal to the number in memory times the number of input pulses to the multivibrator. In this way, the user of the calculator can immediately calculate any one of a number of different parameters, such as areas, volumes, costs and the like, knowing only the unit value of the parameter and counting the total number of units using one of the aforesaid probes.

To utilize the recall memory function of the calculator, rotary switch 62 is provided with an additional two fixed contacts 248 and 250 which are coupled to respective inputs of a gate 252 whose output is coupled to the inputs of flip-flop 244, a gate 254 being used to invert the output of gate 252 before it is coupled to an input of the flip-flop. Fixed contact 248 is coupled by a first diode 256 to the count pulse fixed contact and is coupled by a second diode 258 to one of the inputs of gate 220, such as the input corresponding to the 1/32 fixed contact. Thus, either the count probe or the architect's probe can be used to provide the signal input to multivibrator 12. The purpose of the interconnection of the count pulse fixed contact and the 132 fixed contact is to eliminate the lock-out feature afforded by gate 220. Similarly, fixed contact B is coupled by diode 260 to the count probe fixed contact and by a diode 262 to one of the inputs of gate 232, such as the input corresponding to the 1/50 fixed contact. Thus, when the shiftable contact 60 is on the B position, either the count probe or the engineer's probe can be utilized.

In operation, when it is desired to utilize the memory of the calculator, a particular number representing the unit value of a parameter is first stored in the memory and switch 62 is manipulated until shiftable contact 60 is on the A or B position. Assuming it is on the A position, then the count probe or the architect's probe can be utilized to provide data input to the apparatus.

As a particular probe is used, a series of input pulses are directed to multivibrator 12 and, as each pulse is received, the apparatus operates in the manner described above except that the number in the memory is incremented for each input pulse, assuming switch 135 is in the add position. This means that for a series of pulses, there will be a series of summations of the number stored in memory by virtue of the fact that the signals from gate 98, and counter 18, are directed to the respective inputs of gates 240 which is enabled by virtue of its connection with the A or B position of switch 62. If switch 135 is on the subtract position, a number in the calculator display will be decremented by the unit value in memory for each input pulse to the multivibrator.

I claim:

1. Apparatus for use with an electronic calculator having a keyboard switch means for actuating a first circuitry portion corresponding to a number to be used for calculation and a second circuitry portion corresponding to an arithmetic function capable of being performed by the calculator in carrying out the calculation comprising: means actuated in response to an input signal for generating a pair of output pulses; means coupled with said generating means for causing the deactuation of the same after said output pulses have been generated; means coupled with said generating means and having a pair of signal outputs for providing a pair of signals at said signal outputs thereof as a function of the generation of said output pulses; means coupled with one of the signal outputs for connecting the same to said first circuitry portion of the calculator in bypassing relationship to said keyboard switch means thereof; means coupled with the other signal output for coupling the same to the second circuitry portion of the calculator in bypassing relationship to said keyboard switch means; and means coupled with said generating means for directing an input signal thereto to thereby actuate the same.

2. Apparatus as set forth in claim 1, wherein said directing means comprises an actuatable device having a signal input and being operable to maintain an input signal applied to said generating means for a predetermined interval, and means coupled with the signal input of the device for providing an input pulse therefor.

3. Apparatus as set forth in claim 2, wherein said deactuating means is coupled to said device and is operable to deactuate the same at the end of said interval.

4. Apparatus as set forth in claim 3, wherein said deactuating means includes a comparator.

5. Apparatus as set forth in claim 1, wherein said directing means includes a multivibrator having a signal input and a signal output, said signal output being coupled to said generating means, and a probe coupled to the signal input of the multivibrator and being operable to provide an input pulse thereto.

6. Apparatus as set forth in claim 1, wherein said providing means includes a counter, said connecting means includes a gate, said gate being enabled when a signal is present at said one signal output of the counter.

7. Apparatus for use with an electronic calculator having a keyboard switch means for selectively actuating a plurality of first circuitry portions corresponding to respective numerals to be used for calculations and a second circuitry portion corresponding to an arithmetic function capable of being performed by the calculator in carrying out the calculations comprising: means actuated in response to an input signal for generating a pair of output pulses; means coupled with said generating means for deactuating the same after said output pulses have been generated; means coupled with said generating means and having a pair of signal outputs for providing a pair of signals at said signal outputs thereof as a function of the generation of respective output pulses of said generating means; first means coupled with one of said signal outputs and capable of being selectively enabled for connecting the same to said first circuitry portions of the calculator in bypassing relationship to said keyboard switch means; second means coupled with the other signal output for connecting the same to said second circuitry portion in bypassing relationship to said keyboard switch means; means coupled with said first means for selectively enabling the same; and means coupled with said generating means for directing an input signal thereto to thereby actuate the same.

8. Apparatus as set forth in claim 7, wherein said first means includes a plurality of gates, there being a gate for each first circuitry portion, respectively, each gate having a signal input coupled to said one signal output.

9. Apparatus as set forth in claim 7, wherein said calculator has a pair of second circuitry portions corresponding to a pair of arithmetic functions capable of being alternately performed by the calculator, said second means including a pair of gates capable of being enabled, each gate having a signal input coupled with said other signal output, and including means for selectively enabling said gates.

10. Apparatus as set forth in claim 7, wherein said enabling means includes a selector switch.

11. Apparatus for use with an electronic calculator having a keyboard switch means for selectively actuating a plurality of first circuitry portions corresponding to respective numerals to be used for calculations and a pair of second circuitry portions corresponding to respective arithmetic functions capable of being performed by the calculator in carrying out the calculations comprising: a pulse generator having a signal input and a signal output; an actuatable multivibrator coupled to the signal input of said pulse generator for triggering the same to cause the pulse generator to generate a series of output pulses; means coupled with said multivibrator for actuating the same; means responsive to said output pulses generated by said generating means for deactuating said multivibrator after a predetermined number of output pulses have been generated; a counter having a signal input coupled to said pulse generator and a pair of signal outputs, said counter being operable to successively provide output signals at the signal outputs thereto in response to the generation of said output pulses; a plurality of first gates, there being a first gate for each first circuitry portion of the calculator, respectively, each first gate having an input coupled to one of the signal outputs of the counter and an output adapted to be coupled with a respective first circuitry portion, whereby an input signal can be directed to the first circuitry portion in bypassing relationship to the keyboard switch means; means coupled with said first gates for selectively enabling the same; a pair of second gates, there being a second gate for each second circuitry portion respectively, each second gate having an input coupled to the other signal output of the counter and an output adapted to be coupled with a respective second circuitry portion, whereby an input signal can be directed to the second circuitry portion in bypassing relationship to the keyboard switch means; and means coupled with said second gates for selectively enabling the same.

12. Apparatus as set forth in claim 11, wherein said enabling means for said first gates includes a first selector switch and said enabling means for said second gates includes a second selector switch.

13. Apparatus as set forth in claim 11, wherein said means for actuating the multivibrator includes a number of probe input terminals and a buffer coupling each terminal to the input of the multivibrator, said enabling means for said first gates being operable to selectively enable the probes coupled with said terminals.

14. In combination: an electronic calculator having a keyboard switch means and provided with a plurality of first electronic circuitry portions corresponding to respective numerals to be used for calculations and a pair of second electronic circuitry portions corresponding to arithmetic functions capable of being performed by the calculator in carrying out the calculations, each circuitry portion having a signal input; means for generating a pair of output pulses each time an input pulse is received thereby; means coupled with the generating means for applying a number of input pulses thereto to thereby actuate the same a number of times; means coupled with the generating means for successively directing said output pulses generated for each input pulse to the signal inputs of said first and second circuitry portions of the calculator in bypassing relationship to the keyboard switch means, said directing means including first means coupled with said first circuitry portions for selectively enabling the same and second means coupled with said second circuitry portions for selectively enabling the same.

15. The combination as set forth in claim 14, wherein said first enabling means includes a plurality of gates, there being a gate for each first circuitry portion, respectively, and a selector switch coupled with said gates for selectively enabling the latter.

16. Apparatus as set forth in claim 14, wherein said second enabling means includes a pair of gates, there being a gate for each second circuitry portion, respectively, and a selector switch coupled with said gates for selectively enabling the same.

17. Apparatus as set forth in claim 14, wherein said calculator has a housing, said generating means, said directing means, and the enabling means for each of said first and second circuitry portions, respectively, being disposed within said housing.

18. Apparatus as set forth in claim 17, wherein said applying means includes a multivibrator within said housing, a probe input terminal, and a signal input probe externally of the housing and capable of being coupled to the terminal.

19. Apparatus as set forth in claim 17, wherein said housing has a control panel, said keyboard switch means having manually actuated keys mounted on said panel, said enabling means for each of said first and second circuitry portions, respectively, including a selector switch, the selector switches being mounted on the panel.

20. In combination: an electronic calculator having a housing, a control panel, a keyboard switch means on said panel and electronic circuitry within the housing, said circuitry including a plurality of first circuitry portions corresponding to respective numerals to be used for calculations and a pair of second electronic circuitry portions corresponding to arithmetic functions capable of being performed by the calculator in carrying out the calculations, each circuitry portion having a signal input; a pulse generator within the housing; a multivibrator coupled to the pulse generator for triggering the same to cause the pulse generator to generate a series of output pulses; means coupled with said multivibrator and responsive to said output pulses for deactuating the multivibrator after a predetermined number of output pulses have been generated; a counter within the housing and having a signal input coupled to said pulse generator and a pair of signal outputs, said counter being operable to successively provide output signals at the signal outputs thereof in response to the generation of said output pulses; a plurality of first gates, there being a first gate for each first circuitry portion, respectively, each first gate having an input coupled to one of the signal outputs of the counter and an output coupled with the signal input of a respective first circuitry portion, whereby signals from said one signal output of the counter can be directed to the first circuitry portions in bypassing relationship to the keyboard switch means; means on the control panel for selectively enabling the first gates; a pair of second gates, there being a second gate for each second circuitry portion, respectively each second gate having an input coupled to the other signal output of the counter and an output coupled with the signal input of a respective second circuitry portion, whereby signals at the other signal output of the counter can be directed to the second circuitry portions in bypassing relationship to the keyboard switch means; means carried by the panel for selectively enabling the second gates; a number of probe input terminals extending through the housing; and means coupling said terminals with the input of the multivibrator, whereby the latter will be actuated by a pulse from a probe connected to one of the terminals.

21. The combination as set forth in claim 20, wherein is included means connecting said coupling means with the enabling means for said first gates and being operable to selectively enable the probes of at least certain of the terminals, and including a probe for each of the terminals, respectively.

22. Apparatus for use with an electronic calculator having a keyboard switch means for actuating a first circuitry portion corresponding to a number to be used for calculation and a second circuitry portion corresponding to an arithmetic function capable of being performed by the calculator in carrying out the calculation comprising: means actuated in response to an input signal for generating a pair of output pulses; means having a buffer and coupled with said generating means for directing an input signal thereto to actuate the same; means coupled with said generating means for deactuating the same after said output pulses have been generated; means coupled with said generating means and having a pair of signal outputs for providing a pair of signals at said signal outputs thereof as a function of the generation of said output pulses; means coupled with one of the signal outputs for connecting the same to said first circuitry portion of the calculator in bypassing relationship to said keyboard switch means thereof; and means coupled with the other signal output for coupling the same to the second circuitry portion of the calculator in bypassing relationship to said keyboard switch means.

23. Apparatus as set forth in claim 22, wherein said buffer includes first means for receiving a plurality of input pulses, at a first rate, and second means for applying a plurality of output pulses to the generating means with the last-mentioned output pulses being equal in number to the last-mentioned input pulses at a second rate less than said first rate.

24. Apparatus as set forth in claim 23, wherein said first means includes a first counter, said second means including a second counter, a comparator for comparing the counts of the first and second counters, a source of pulses, and means for gating the pulses to said generating means until a comparison of the counts of said counters is found by said comparator.

25. Apparatus as set forth in claim 24, wherein said generating means includes a multivibrator having an input and an output, means connecting the output of the multivibrator to the input of the second counter, said gating means being connected to the input of said multivibrator, and a data input terminal connected to the input of the first counter.

26. Apparatus for use with an electronic calculator having a keyboard switch means and signal input means coupled with the switch means for receiving successive signals therefrom including a first signal representing a number to be used in a calculation and a second signal representing an arithmetic function capable of being performed by the calculator in carrying out the calculation comprising: means having a signal input for generating a series of output pulses for each input pulse received at said signal input; means coupled with said signal input for directing an input pulse thereto; first means coupled with the generating means and adapted to be coupled with said signal input means for coupling a first of the output pulses to said signal input means in bypassing relationship to said keyboard switch means; and second means coupled with said generating means and adapted to be coupled with said signal input means for coupling a second output pulse to said signal input means in bypassing relationship to said keyboard switch means, whereby the first and second output pulses can be used to represent, respectively, a number to be used in a calculation by the calculator and an arithmetic function to be performed by the calculator in carrying out the calculation.

27. Apparatus as set forth in claim 26, when said directing means for the first output pulse and the directing means for the second output pulse include a counter coupled to the generating means and having at least a pair of output terminals, the output terminals adapted to be coupled to said signal input means of the calculator.

28. Apparatus for use with an electronic calculator having a keyboard switch means for actuating a first circuitry portion corresponding to a number to be used for a calculation and a second circuitry portion corresponding to an arithmetic function capable of being performed by the calculator in carrying out the calculation comprising: means having a signal input for generating a series of output pulses in response to the reception of an input signal at the signal input thereof; means coupled with said generating means for directing an input signal thereto to thereby cause generation of said series of output pulses; means coupled with the generating means for directing at least one of the output pulses generated thereby to said first circuitry portion of the calculator in bypassing relationship to said keyboard switch means thereof; and means coupled with the generating means for directing at least one other output pulse to the second circuitry portion of the calculator in bypassing relationship to said keyboard switch means.

29. Apparatus as set forth in claim 28, wherein the directing means for the one output pulse and the directing means for the other output pulse include a counter having an input terminal and a pair of output terminals, the input terminal of the counter being coupled to the generating means and the output terminals adapted to be coupled to the first and second circuitry portions, respectively.

30. Apparatus as set forth in claim 28, wherein said generating means includes a comparator which limits the output pulses to a predetermined number in response to each input pulse thereof.

31. Apparatus for use with an electronic calculator having a keyboard switch means for selectively actuating a plurality of first circuitry portions corresponding to respective numerals to be used for calculations, a second circuitry portion corresponding to a control function capable of being performed by the calculator, and a third circuitry portion corresponding to an arithmetic function capable of being performed by the calculator comprising: means actuated in response to an input signal for generating a series of output pulses; first means coupled with the generating means and capable of being selectively enabled for directing a first of said output pulses corresponding to an input pulse to the first circuitry portion in bypassing relationship to said keyboard switch means; second means coupled with the generating means and capable of being selectively enabled for directing said first output pulse to the second circuitry portion; third means coupled with the first means and said second means for selectively enabling the same, whereby the first output pulse can be used to actuate either the first circuitry portion or the second circuitry portion; and fourth means coupled with the generating means for directing a second of said output pulses corresponding to an input pulse to the third circuitry portion in bypassing relationship to said keyboard switch means.

32. In combination: an electronic calculator having a keyboard switch means and a signal input means coupled with the switch means for receiving input signals therefrom including a first signal representing a number to be entered the calculator for use in calculations and a second signal to be used to actuate an arithmetic function of the calculator in carrying out the calculation; means independent of said keyboard switch means and responsive to an input pulse for generating a number of output pulses; first means responsive to a first of the output pulses for directing the same to the signal input means in bypassing relationship to the keyboard switch means; and second means responsive to a second of said output pulses corresponding to each input pulse for directing the other output pulses to the signal input means in bypassing relationship to said keyboard switch means, whereby the first and second output pulses can be used, respectively, to represent a number to be entered into the calculator for use in calculations and an arithmetic function to be performed by the calculator in carrying out the calculation.

33. Apparatus as set forth in claim 32, wherein said generating means includes a pulse generator having output means at which a number of output signals are applied when an input signal is received thereby, means for deactuating the pulse generator after said output signals have been generated, a counter having a signal input coupled with the output means of the pulse generator and a number of outputs coupled with said first means and said second means, said counter being operable to provide said output pulses in response to successive input pulses received at the signal input thereof.

34. In combination: an electronic calculator having a keyboard switch means for selectively actuating a plurality of first circuitry portions corresponding to respective numerals to be used for calculations, at least one second circuitry portion corresponding to a control function capable of being performed by the calculator, and a third circuitry portion corresponding to an arithmetic function capable of being performed by the calculator; means actuated in response to an input signal for generating a series of output pulses; first means for each first circuitry portion, respectively, each first means being coupled with the generating means and capable of being selectively enabled for directing a first of said output pulses corresponding to an input pulse to its respective first circuitry portion in bypassing relationship to said keyboard switch means; second means coupled with said generating means and capable of being selectively enabled for directing said first output pulse to the second circuitry portion; third means coupled with each first means and the second means for selectively enabling either a first means or said second means, whereby the first output pulse can be used to actuate either a first circuitry portion or the second circuitry portion; and fourth means coupled with the generating means for directing a second of said output pulses corresponding to an input pulse to the third circuitry portion in bypassing relationship to said keyboard switch means.

* * * * *